United States Patent [19]

Milam

[11] Patent Number: 5,794,145
[45] Date of Patent: Aug. 11, 1998

[54] MOBILE DEVICE MULTIBAND ANTENNA SYSTEM

[75] Inventor: Timothy S. Milam, Millersburg, Ohio

[73] Assignee: Telxon Corporation, Akron, Ohio

[21] Appl. No.: 664,261

[22] Filed: Jun. 7, 1996

[51] Int. Cl.$^6$ ............................................. H04Q 7/00
[52] U.S. Cl. ..................... 455/426; 455/351; 455/575
[58] Field of Search ........................... 455/426, 575, 455/90, 95, 128, 347, 351, 8, 11.1, 553, 82–83, 103, 132, 140; 370/339; 343/700 MS; 395/228

[56] References Cited

U.S. PATENT DOCUMENTS

| | | | |
|---|---|---|---|
| 4,008,479 | 2/1977 | Smith | 343/895 |
| 4,095,229 | 6/1978 | Elliott | 455/82 X |
| 4,396,941 | 8/1983 | Nishimura et al. | 455/347 X |
| 4,485,383 | 11/1984 | Maher | 342/352 |
| 4,527,163 | 7/1985 | Stanton | 343/700 MS |
| 5,127,042 | 6/1992 | Gillig et al. | 455/11.1 X |
| 5,170,493 | 12/1992 | Roth | 455/82 |
| 5,258,728 | 11/1993 | Taniyoshi et al. | 370/339 X |
| 5,386,203 | 1/1995 | Ishihara | 455/82 X |
| 5,430,769 | 7/1995 | Patsiokas et al. | 375/347 |
| 5,471,659 | 11/1995 | Wong | 455/132 |
| 5,590,174 | 12/1996 | Tsuji et al. | 455/553 X |

Primary Examiner—Thomas J. Mullen, Jr.
Attorney, Agent, or Firm—Renner, Otto, Boisselle & Sklar, P.L.L.

[57] ABSTRACT

A cellular communication system and mobile device in which the mobile device utilizes a single antenna to handle communications for two or more radios. Each radio is coupled to the antenna by an appropriate filter or the like which routes signals received in different frequency bands to the appropriate radio for processing. By using only one antenna to service multiple radios, problems associated with mutual coupling between multiple antennas can be eliminated. Also, use of a diversity antenna having left and right hand circularly polarized elements provides improved immunity to cross-polarization.

25 Claims, 6 Drawing Sheets

MOBILE DEVICE MULTIBAND ANTENNA SYSTEM

TECHNICAL FIELD

The present invention relates generally to mobile devices used in cellular communications, and more particularly to mobile devices having two or more radios which share a common antenna.

BACKGROUND OF THE INVENTION

In recent years, the use of cellular communication systems having mobile devices which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications which allow users to roam across large geographic regions while retaining telephonic access. Paging networks also utilize cellular communication systems which enable a user to be paged anywhere within a geographic region.

A typical cellular communication system includes a number of fixed base stations or access points interconnected by a cable medium which forms a hardwired network. The hardwired network is often referred to as a system backbone. Also included in many cellular communication systems are intermediate base stations which are not directly connected to the hardwired network. Intermediate base stations, often referred to as wireless base stations or repeaters, increase the area within which base stations connected to the hardwired network can communicate with mobile devices. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile device with an acceptable error rate. Typically, base stations will be positioned along the backbone such that the combined cell area coverage from each base station provides full coverage of a building or site.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and a base station to which the mobile device is currently registered. As the mobile device is portable and roams from one cell to another, the mobile device will typically reassociate itself with a new base station each time the mobile device enters a new cell thereby causing the former base station to which the mobile device was associated to deregister the mobile device.

In order to communicate wirelessly with base stations on the system backbone, each mobile device typically has an antenna connected to a radio for transmitting and receiving radio frequency (RF) signals. In some environments, it is necessary that the mobile device communicate with two or more cellular communication systems or a cellular communication system and another radio communication system, for example. Mobile devices in such situations typically include two or more radios with corresponding antennas in order to communicate wirelessly with the respective communication systems. Such multiple radios may operate in different frequency bands, employ different modulation techniques, or the like, which will allow the multiple radios within the mobile device to operate simultaneously.

For example, a mobile device such as a hand portable bar code reader or a portable workslate computer may have two radios with corresponding antennas which can simultaneously communicate with two different cellular communication systems. This is often useful in situations where, for example, information is received by the mobile device from a local cellular communication system in one frequency band and then must be communicated in real time to a central controller via a WAN based cellular communication system in a second frequency band. Without the capability of communicating in two frequency bands, the information stored in the mobile device from the local cellular communication system would have to be physically transferred to a radio capable of communicating with the WAN based cellular communication system. This of course adds significantly to the time and effort needed to transfer data.

As another example, a truck operator may keep a portable data terminal for keeping track of inventory, shipping information, scheduling, etc. The data terminal may include an inexpensive narrow band radio for communicating with a computer located on board the truck, and a more expensive spread spectrum radio for communicating with cellular communication systems located at stores and other facilities where the truck may visit. In order to accommodate each different type of radio, the portable data terminal includes a different antenna for each radio.

Unfortunately, there are a number of drawbacks associated with the aforementioned types of mobile devices. Since each device includes two or more antennas located in close proximity to each other, coupling may occur between the antennas. Such coupling can result in intermodulation products, changes in VSWR and/or radiation pattern distortion, for example. As a specific example, if a particular mobile device includes two antennas and information is being transmitted from the first antenna, the second antenna may simultaneously receive at least a portion of the transmitted signal. This can result in intermodulation products being introduced in a signal transmitted by the second antenna and/or a reduction in the power level of the signal transmitted by the second antenna. In systems where both radios are fairly active, such interference can place a significant burden on overall system performance.

An additional drawback associated with conventional mobile devices is that such devices typically utilize linearly polarized antennas to handle the wireless communications. Consequently, the mobile devices are prone to loss of signal strength in the event the orientation of the antennas differs from that of the antennas at the other end of the communication. A known approach for reducing such effects of cross-polarization is to use diversity in the case of each antenna in the mobile device. More specifically, each linearly polarized antenna is replaced by two linearly polarized antennas oriented at orthogonal angles to one another. The antenna providing the strongest signal is selected to service the radio within the mobile device.

Unfortunately, the use of diversity antennas requires that an additional antenna be added to the mobile device for each radio in order to minimize the possibility of cross-polarization. This increases the cost and size of the mobile device, as well as increasing the probability of mutual coupling between the antennas. For example, many mobile devices are individually handled and operated by a single user over extended periods of time and the extra size and weight associated with the additional antennas can be a costly drawback to utilizing multiple radios. This problem only increases as the market place requires that even more radios be placed in each mobile device in order to stay competitive.

In view of the aforementioned shortcomings associated with conventional mobile devices, there is a strong need in the art for a cellular communication system in which mobile devices having multiple radios avoid problems associated with mutual coupling between different antennas. Moreover, there is a strong need in the art for a mobile device which utilizes a single antenna to service two or more radios so as to reduce the size, weight and cost of the mobile device. In addition, there is a strong need in the art for a mobile device which avoids the problems associated with cross-polarization without substantially adding to the cost or complexity of the device.

SUMMARY OF THE INVENTION

The present invention relates to a cellular communication system and mobile device in which the mobile device utilizes a single antenna to handle communications for two or more radios. Each radio is coupled to the same antenna by an appropriate filter or the like which routes signals received in different frequency bands to the appropriate radio for processing. By using only one antenna to service multiple radios, problems associated with mutual coupling between multiple antennas can be eliminated. Moreover, the single antenna reduces the overall size, weight and cost of the mobile device when two or more radios are included. In the preferred embodiment, the antenna is circularly polarized. As a result, the mobile device avoids problems associated with cross-polarization in connection with other linearly polarized antennas.

According to one particular aspect of the invention, a mobile device is provided including an antenna, a plurality of radios each operatively connected to the antenna for transmitting and receiving signals using the antenna, and a portable housing in which the plurality of radios are located.

According to another aspect of the invention, a cellular communication system is provided. The system includes a system backbone, a host computer coupled to the system backbone, a plurality of base stations coupled to the system backbone and communicating with the host computer, each of the base stations comprising a base station transceiver for transmitting and receiving wireless communications, a local computer including a local computer transceiver for transmitting and receiving wireless communications, and at least one mobile device, each of the at least one mobile device including: an antenna, and a plurality of radios within a portable housing each operatively connected to the antenna for transmitting and receiving signals using the antenna, wherein a first radio included in the plurality of radios communicates with at least one of the plurality of base stations, and a second radio included in the plurality of radios communicates with the local computer transceiver.

In accordance with still another aspect of the invention, a mobile device is provided including an antenna system, a radio operatively connected to the antenna system for transmitting and receiving signals using the antenna system, and a portable housing in which the radio is located, wherein the antenna system comprises a first antenna which is right hand circularly polarized and a second antenna which is left hand circularly polarized.

According to yet another aspect of the invention, a cellular communication system is provided. The system includes a first communications network including a first network backbone, a first host computer coupled to the first backbone, and at least one first base station coupled to the first system backbone and communicating with the first host computer, each of the first base stations having a base station transceiver for transmitting and receiving wireless communications; a second communications network including a second network backbone, a second host computer coupled to the second backbone, and at least one second base station coupled to the second system backbone and communicating with the second host computer, each of the second base stations having a base station transceiver for transmitting and receiving wireless communications; and at least one mobile device, each of the at least one mobile device including an antenna, and a plurality of radios within a portable housing each operatively connected to the antenna for transmitting and receiving signals using the antenna, wherein a first radio included in the plurality of radios communicates with at least one of the at least one first base stations coupled to said first system backbone, and a second radio included in the plurality of radios communicates with at least one of the at least one second base stations coupled to said second system backbone.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
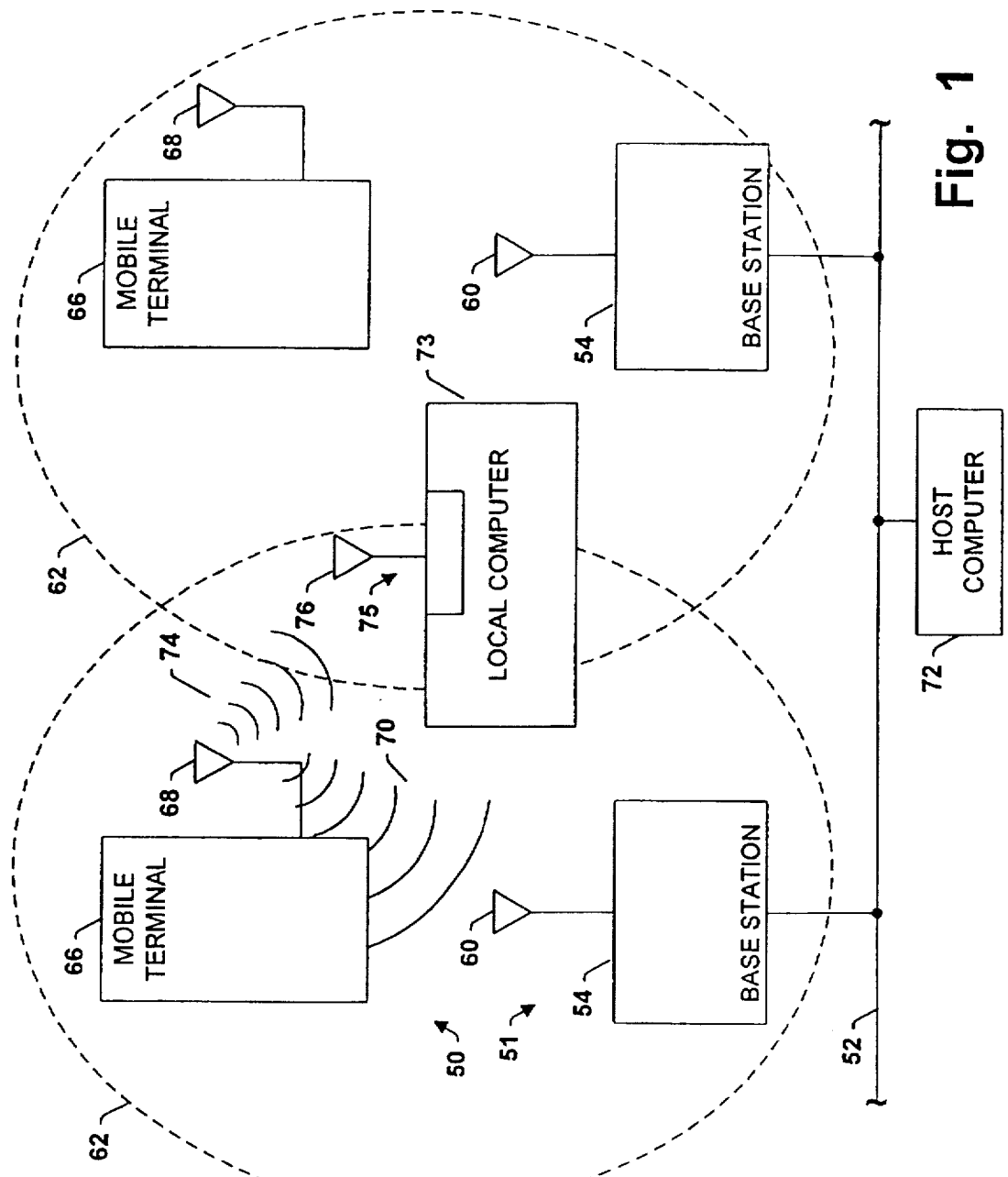
FIG. 1 is a block diagram of a cellular communication system in accordance with the present invention.

The cellular communication system and mobile devices of the present invention will now be described with reference to the drawings wherein like reference numerals are used to refer to like elements throughout.

As mentioned above, the present invention relates to cellular communication systems which include mobile devices that roam from cell to cell. Such mobile devices can be data terminals, telephones, pagers, etc. In the exemplary embodiment described hereinafter, each mobile device is a mobile data terminal (hereinafter "mobile terminal") used to communicate data such as inventory or the like. However, it is recognized that the invention contemplates other types of mobile devices and is not necessarily limited to mobile terminals.

Referring now to FIG. 1, a cellular communication system 50 is shown in accordance with the exemplary embodiment of the present invention. The cellular communication system 50 includes a network 51 having a hardwired data communication path 52. The hardwired data communication path may be made of twisted pair cable, shielded coaxial cable or fiber optic cable, for example, and is often referred to as the system backbone 52. Connected to the system backbone 52 are several base stations 54. Each base station 54 serves as an entrance point through which wireless communications may occur with the system backbone 52.

Each base station 54 is capable of wirelessly communicating with other devices in the system 50 via an antenna 60. A geographic cell 62 associated with each base station 54 defines a region, or area of coverage, in which successful wireless communication may occur. Depending on the type of antenna 60 selected and the output power of the respective base station, the cell 62 may take one of several different forms and sizes. For example, FIG. 1 depicts the base stations 54 as utilizing an omnidirectional antenna 60 wherein a generally spherical cell area of coverage is obtained. However, a directed yagi-type antenna or other form of antenna could also be used as will be readily appreciated.

The cellular communication system 50 also includes one or more mobile terminals 66. As is explained more fully in connection with FIGS. 2 and 3, each mobile terminal 66 includes at least two different radios which allow the mobile terminal 66 to communicate with different networks, radios, etc. simultaneously on different frequency bands, for example. Unlike conventional mobile terminals, however, each mobile terminal 66 includes a single antenna 68 which is shared by each of the radios included in the mobile terminal 66. By each of the two or more radios in the mobile terminal 66 sharing a single antenna 68, the present invention eliminates problems associated with mutual coupling which commonly arises in terminals having more than one antenna closely situated together. Additionally, since only a single antenna 68 is needed to handle multi-band communication, additional benefits are gained due to the space and weight savings obtained over conventional mobile terminals employing two or more antennas.

For example, in the cellular communication system 50 shown in FIG. 1 a mobile terminal 66 communicates with the network 51 using a first radio (not shown) by exchanging radio communications 70 with a base station 54 connected to the backbone 52 via the antenna 66. The mobile terminal 66 communicates with a host computer 72 or other device on the system backbone 52, for example, by exchanging radio communications 70 with the base station 54 which in turn communicates directly over the system backbone 52 with the host computer 72 or such other device. As is conventional, the mobile terminal 66 is able to communicate with devices on the system backbone 52 via a selected base station 54. Upon roaming from one cell 62 to another, the mobile terminal 66 is configured to associate itself with a new base station 54.

The same mobile terminal 66, on the other hand, also communicates with a local computer 73, another cellular communication system, or the like, using a second radio (not shown) by exchanging radio communications 74 via the antenna 68. The local computer 73 in this case includes a radio transceiver 75 with an antenna 76 which allows it to communicate with the mobile terminal 66. In another embodiment, the local computer 73 is actually a base station belonging to another cellular communication system which is structured similar to the cellular communication system 50.

The cellular communication system 50 may be of the type utilized in retail stores or warehouses, for example. Such systems are useful for tracking inventory and replenishing stock. Employees may enter inventory information using hand-held or portable mobile terminals 66 which can be carried throughout a store or warehouse. As an example, a mobile terminal 66 may include a bar code reader for reading inventory information in a warehouse. The information thus entered into the mobile terminal 66 can then be transferred to the system backbone 52 by the first radio via a base station 54. At the same time, the mobile terminal 66 can communicate with the local computer 73 using the second radio in order to communicate ordering information, for example.

Regardless of the particular application of the two or more radios in each mobile terminal 66, the use of a single antenna 68 shared by each of the radios within the mobile terminal 66 avoids the aforementioned problems with mutual coupling between antennas. Moreover, additional benefits are obtained in relation to size and weight savings, etc.

Figure 2:
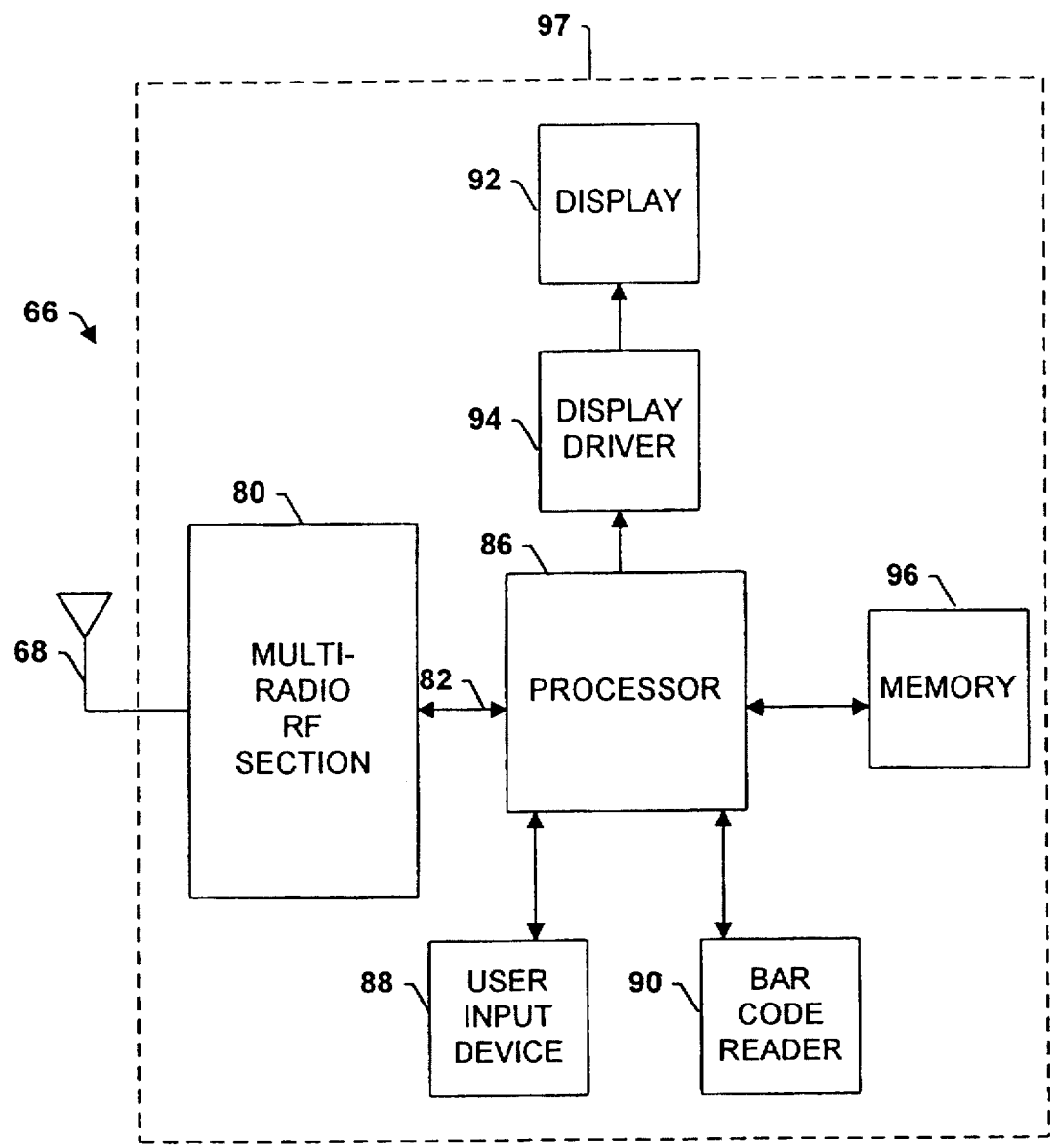
FIG. 2 is a block diagram of a mobile terminal with antenna in accordance with the present invention.

Referring now to FIG. 2, a block diagram of an exemplary mobile terminal 66 is shown. As noted above, each mobile terminal 66 includes an antenna 68 for receiving and transmitting signals. The antenna 68 is connected to a multiple-radio RF section 80 which, in the present embodiment, includes two separate radios for transmitting and receiving radio communications although certainly more radios are possible. As described below in connection with FIG. 3, signals received by the antenna 68 are coupled to the receivers of the respective radios. On the other hand, signals to be transmitted are coupled from the outputs of the transmitters of the respective radios to the antenna 68.

The RF section 80 is coupled via a control/data bus 82 to a processor 86 included in the mobile terminal 66. The processor 86 is responsible for controlling the general operation of the mobile terminal 66 with respect to processing and storing information received and transmitted by the RF section 80. The processor 86 is programmed to control and to operate the various components within the mobile terminal 66 in order to carry out the various functions described herein. An operator input device 88 is coupled to the processor 86 which allows an operator to input data to be communicated to the system backbone 52 or the local computer 73 such as inventory data, ordering information, and the like. The input device 88 can include such items as a keypad, touch sensitive display, etc. The mobile terminal 66 also may include a bar code reader 90 coupled to the processor 86 for providing another form of data input.

A display 92 is also connected to and controlled by the processor 86 via a display driver circuit 94. The display 92 serves as a means for displaying information stored within the mobile terminal 66 and/or received over the system backbone 52 via a base station 54 or received from the local computer 73. The display 92 can be a flat panel liquid crystal display with alphanumeric capabilities, for example, or any other type of display as will be appreciated.

A memory 96 is included in each mobile terminal 66 for storing program code executed by the processor 86 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 96 also serves as a storage medium for storing information received from or intended to be transmitted to a base station 54 or the local computer 73 as discussed herein. With the exception of the antenna 68, the components making up the mobile terminal 66 are preferably housed in a palm-sized housing represented in phantom by line 97. This makes the mobile terminal 66 highly portable and easy to carry from one cell to another. The housing 97 can be made of metal, high strength plastic or the like. The antenna 68 extends from the housing much like a cordless telephone antenna.

In the preferred embodiment, the antenna 68 is a circularly polarized, omnidirectional type antenna. By being circularly polarized, the antenna 68 is able to receive any signal sent by a linearly polarized antenna without concern for cross-polarization loss. Thus, the antennas 60 and 76 of the base stations 54 and the local computer 73, respectively, may be linearly polarized without concern about the relative orientation of the mobile terminal antenna 68. Hence, even if transmissions from the base station 54 or local computer 73 undergo numerous reflections and/or other propagation effects which may change the orientation of the linearly polarized signal, the antenna 68 will be able to receive the transmission with relatively little loss. Similarly, circularly polarized transmissions from the antenna 68 can be received by the antennas 60 and 76 regardless of their particular orientation. An exemplary omnidirectional, circularly polarized antenna suitable for use as the antenna 68 is described in U.S. Pat. No. 4,527,163 for a "Omnidirectional, Circularly Polarized, Cylindrical Microstrip Antenna". The antenna 68 can be either right or left hand circularly polarized as will be appreciated.

Figure 3:
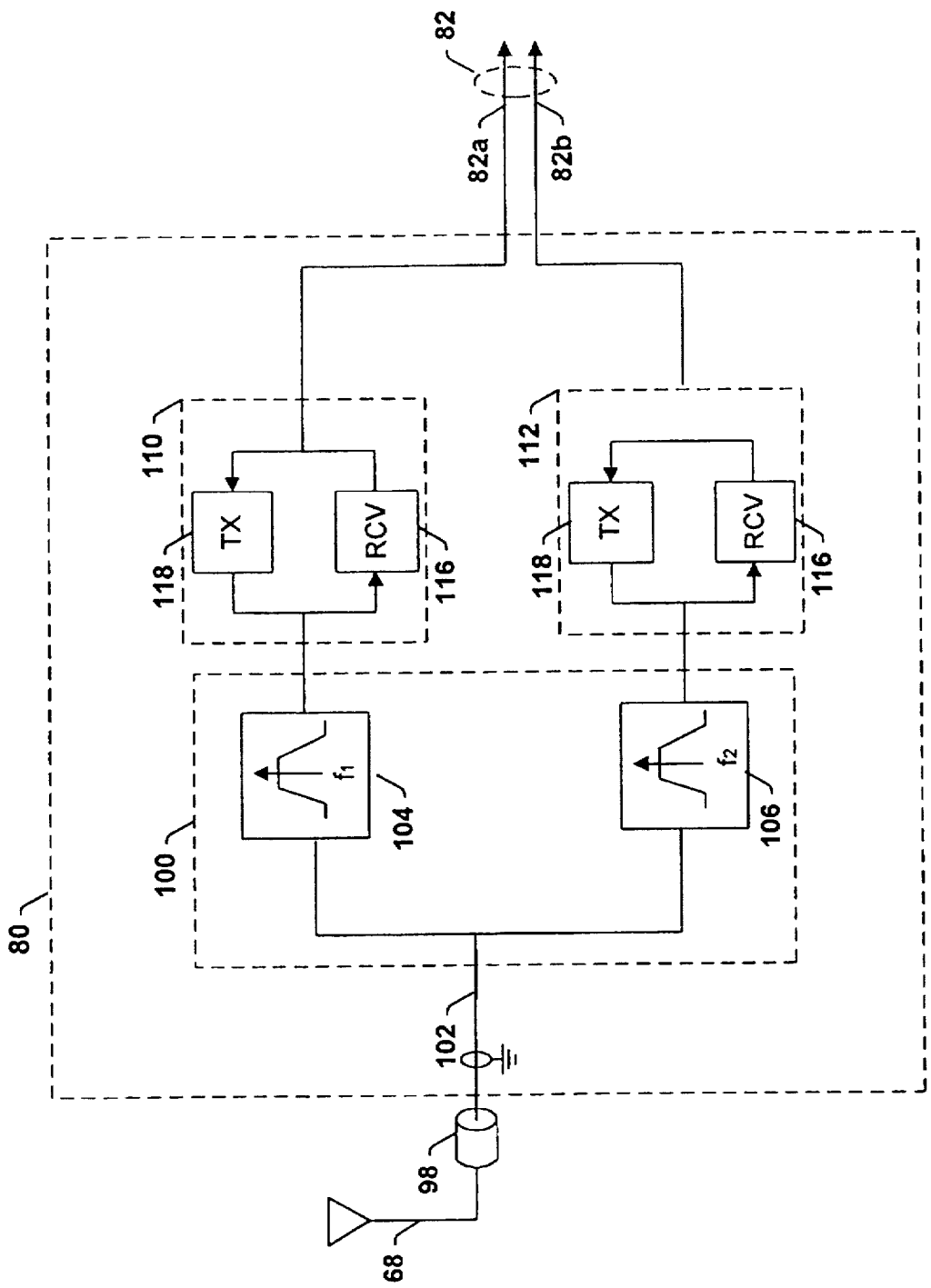
FIG. 3 is a detailed block diagram of the RF section of the mobile terminal of FIG. 2 in accordance with the present invention.

FIG. 3 illustrates the antenna 68 and the RF section 80 in more detail. The antenna 68 is coupled to the front end of the RF section 80 via a coaxial connector 98 or the like. Alternatively the antenna 68 may be soldered directly to the RF section 80. In particular, the antenna 68 is coupled to a filter array 100 included within the RF section 80 which serves to separate the signals received and transmitted by the antenna 68 into discrete frequency bands. These frequency bands correspond to the operating frequency bands of the respective radios included in the mobile terminal 66. In the present embodiment, signals received by the antenna 68 are connected to line 102 of the RF section 80 as shown. These signals are connected in parallel to one port of bandpass filters 104 and 106 having center frequencies of f1 and f2, respectively. For example, the bandpass filter 104 is designed to pass signals only in the 2.4–2.48 gigahertz (GHz) band whereas the bandpass filter 106 is designed to pass signals only in the 902–928 megahertz (MHz) band. Preferably, the bandpass filters 104 and 106 are designed according to conventional techniques to provide at least on the order of 30 decibels (db) isolation between the respective bands.

The other port of each of the bandpass filters 104 and 106 is connected to corresponding first and second radios 110 and 112, respectively, included in the RF section 80. In the exemplary embodiment, the first radio 110 is a spread spectrum direct sequence radio communicating in the 2.4–2.48 GHz band for sending and receiving transmissions in connection with the base stations 54 (FIG. 1). The second radio 112 is a narrow band radio operating in the 902–928 MHz band for sending and receiving transmissions in connection with the local computer 73. Each radio 110 and 112 includes an RF receiver 116 which receives RF transmissions in the respective frequency bands via the antenna 68 and demodulates the signal to obtain digital information modulated thereon. The information is then provided by the RF receiver 116 to the processor 86 via a corresponding portion (e.g., 82a, 82b) of the control/data bus 82.

Each radio 110 and 112 also includes an RF transmitter 118. In the event the mobile terminal 66 is to transmit information to the system backbone 52 in response to an operator input at input device 88, for example, the processor 86 provides such information to the RF transmitter 118 in the first radio 110 on bus portion 82a together with control instructions to transmit the information. In turn, the RF transmitter 118 modulates the information onto a carrier within the 2.4–2.48 GHz band which is then provided to the bandpass filter 104. The bandpass filter 104 passes the modulated carrier onto line 102 and to the antenna 68 so as to be transmitted to the particular base station 54 with which the mobile terminal 66 is registered. Similarly, in the event the mobile terminal 66 is to transmit information to the local computer 73 the processor 86 provides such information to the RF transmitter 118 in the second radio 112 on bus portion 82b together with control instructions to transmit the information. In turn, the RF transmitter 118 modulates the information onto a carrier in the 902–928 MHz band which is then provided to the bandpass filter 106. The bandpass filter 106 consequently passes the modulated carrier onto line 102 and to the antenna 68 so as to be transmitted to the local computer 73.

Accordingly, the mobile terminal 66 can provide simultaneous radio operation for two or more radios. As represented in FIG. 3, both the first radio 110 and the second radio 112 are connected independently to the processor 86 via portions 82a and 82b. Preferably the operating speed of the processor 86 is sufficiently high to allow a single processor 86 to process communications corresponding to both or all radios essentially simultaneously via multitasking or the like. Alternatively, the processor 86 may in fact be made up of a plurality of separate processors (e.g., two) operating in parallel with each radio (e.g., radios 110 and 112) having its own dedicated processor for controlling the operation thereof. Programmed instructions stored in the memory 96 enables the processor 86 to determine which radio 110 or 112 is responsible for handling various types of transmissions so that the processor 86 can determine which particular radio is to transmit the information. To the extent possible, the processor 86 is programmed to avoid having two or more radios transmit information at the same time so as to minimize any possible interference between the transmitted signals.

Figure 4:
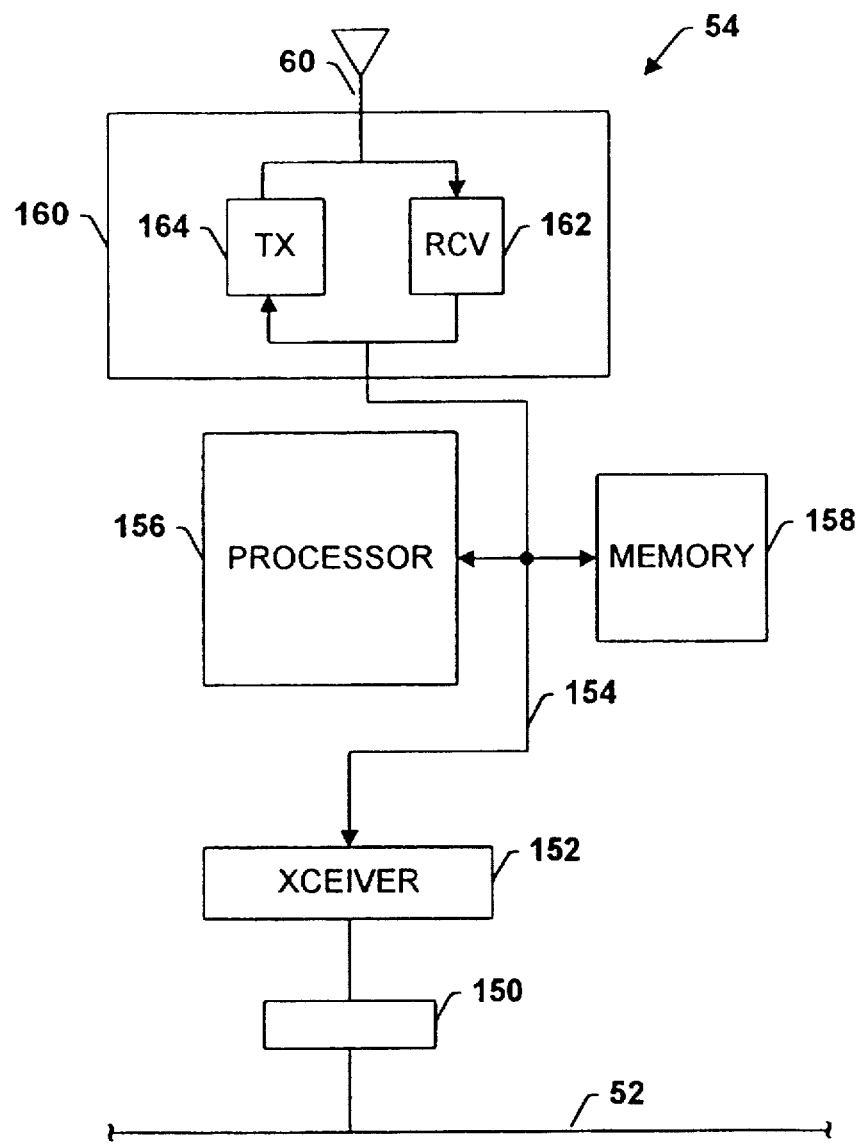
FIG. 4 is a block diagram of a base station as used in the cellular communication system of FIG. 1 in accordance with the present invention.

Referring now to FIG. 4, a block diagram representative of each base station 54 is shown. Each base station 54 is connected to the system backbone 52 via a connector 150 such as a DB-9 or RJ-45 connector. The connector 150 is connected to the system backbone 52 at one end and to a network adapter transceiver 152 included in the base station 54 at the other end. The network adapter transceiver 152 is configured according to conventional network adapter transceiver techniques to allow the base station 54 to communicate over the system backbone 52. The network adapter transceiver 152 is also connected to an internal bus 154 included within the base station 52. The base station 52 further includes a processor 156 connected to the bus 154 for controlling and carrying out the operations of the base station 54. The processor 156 may include any of a variety of different microprocessors, such as the Motorola 68360 (25 MHz) or Intel 80386 microprocessors.

The base station 54 also includes a memory 158 connected to the bus 154. The memory 158 stores program code executed by the processor 156 to control the other elements within the base station 54 to carry out the functions referred to herein. The memory 158 also serves to buffer information such as information received over the system backbone 52 or those transmitted to or received from the mobile terminals 66. Also connected to the bus 154 is an RF section 160 included in the base station 54 which operates in the aforementioned 2.4–2.48 GHz band. The RF section 160 includes the aforementioned antenna 60 for receiving radio signals from and transmitting radio signals to mobile terminals 66 within the cell area 62 of the base station 54. Information transmitted from a mobile terminal 66 to the base station 54 is received via the antenna 60 and is processed by an RF receiver 162 which demodulates and decodes the signal and converts the information to a digital signal. The processor 156 in the base station 54 then processes the information according to conventional techniques and stores the information in the memory 158 until such time as the base station 54 is able to transmit the information to its intended destination on the system backbone 52 via the network adapter transceiver 152 and connector 150.

Information which is transmitted to the base station 54 via the system backbone 52 for transmission to a mobile terminal 66 is received by the network transceiver 152. The processor 156 controls an RF transmitter 164 included in the RF section 160, the RF transmitter 164 also being connected to the bus 154. The processor 156 causes the RF transmitter 164 to modulate an RF signal using spread spectrum techniques, for example, which in turn carries the information to the appropriate mobile terminal 66. Exemplary hardware for carrying out the above-described basic functions of transmitting and receiving data between the system backbone 52 and one or more mobile terminals 66 is found in the ARLAN 631® Token Ring Access Point, which is commercially available from Aironet Wireless Communications, Inc., Akron, Ohio.

Although the preferred embodiment has been described with reference to mobile terminals having two radios, the invention contemplates even more than two radios communicating via the same antenna. In such situation, each radio would have a corresponding filter in the filter array 100 which limits the signals associated with the radio to those in a particular frequency range. In the preferred embodiment, each radio operates in a separate frequency band as will be appreciated. Also, although the present invention employs an array of bandpass filters to separate the signals, other filtering techniques may also be employed as will also be appreciated.

Figure 5:
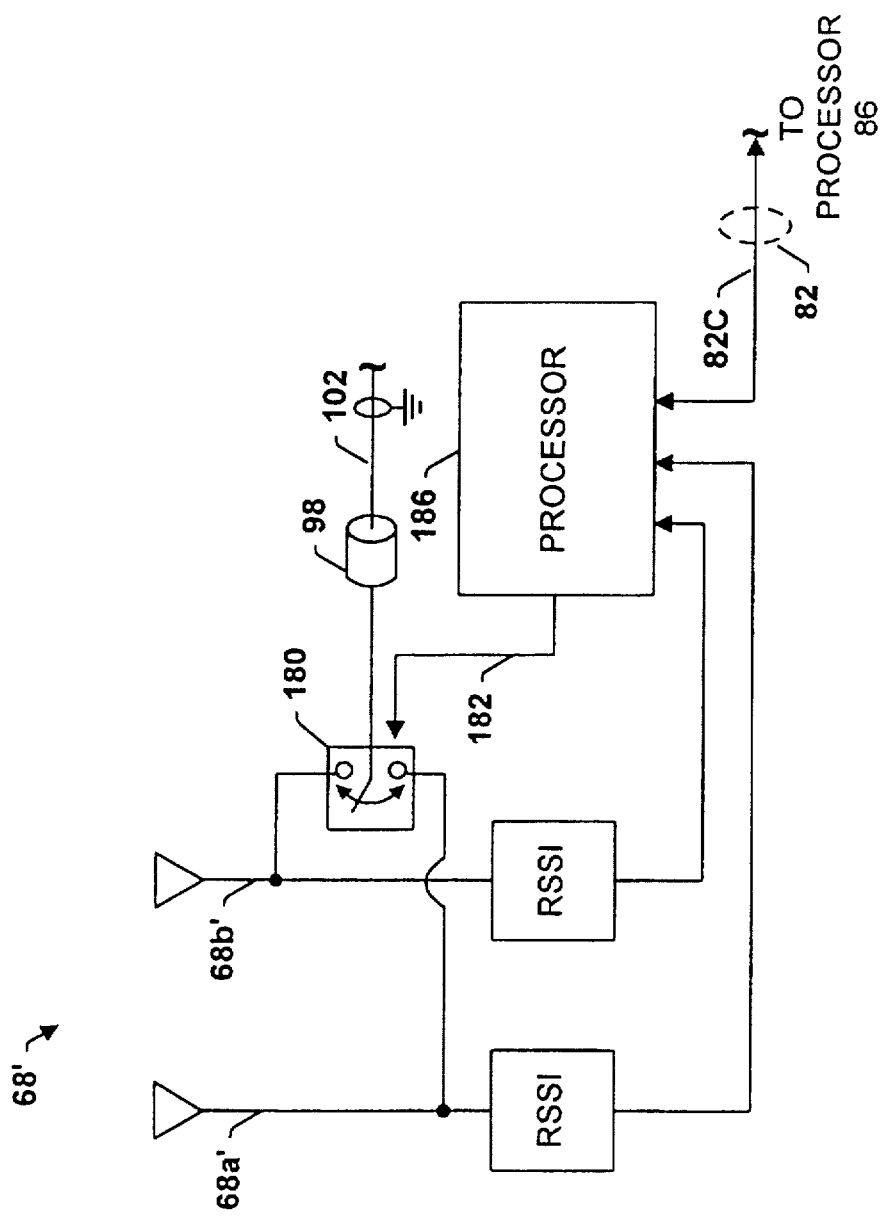
FIG. 5 is a schematic diagram of another embodiment of an antenna for a mobile terminal in accordance with the present invention.

FIG. 5 shows another embodiment of an antenna, designated 68', which is shared by each of the radios in the mobile terminal 66. In this embodiment, the antenna 68' is a diversity antenna made up of two circularly polarized antennas 68a' and 68b'. The antenna 68a' is a right hand circularly polarized antenna whereas the antenna 68b' is a left hand circularly polarized antenna. Again, each of the antennas 68a' and 68b' could be of the type disclosed in the aforementioned U.S. Pat. No. 4,527,163. Such a configuration is particularly useful in circumstances where it is anticipated that a mobile terminal 66 may receive signals from a circularly polarized antenna. Not only will both antennas be able to receive linearly polarized transmissions, but also the antennas 68a' and 68b' will be available for receiving and transmitting right hand and left hand circularly polarized signals, respectively.

The terminals of the antennas 68a' and 68b' are connected to a controllable switch 180 which determines which of the antennas 68a' and 68b' is connected to line 102 of the mobile terminal 66 via the connector 98. A control line 182 from a control processor 186 which controls the switch 180 so that the processor 186 can select which antenna 68a' or 68b' is providing the strongest signal at any given time based on conventional techniques. For example, the control processor 186 measures the received signal strength from each of the antennas 68a' and 68b' via a respective RSSI circuit and selects the antenna providing the strongest signal. The processor 186 controls the position of the switch 180 such that the output from the selected antenna is provided on line 102 to the filter array 100 in the same manner described above in relation to FIG. 3. In order to transmit information, the processor 86 provides control information to the control processor 186 via the bus 82. Such control information indicates which antenna 68a' and 68b' is intended to transmit at a particular time. The control processor 186 in turn controls the switch 180 to select the desired antenna.

Thus, it will be appreciated that the present invention provides a mobile device and cellular communication system which avoids the problems associated with mutual coupling between antennas and cross polarization. In addition, the present invention is useful in reducing the size and weight of the mobile device as compared to the prior art.

Figure 6:
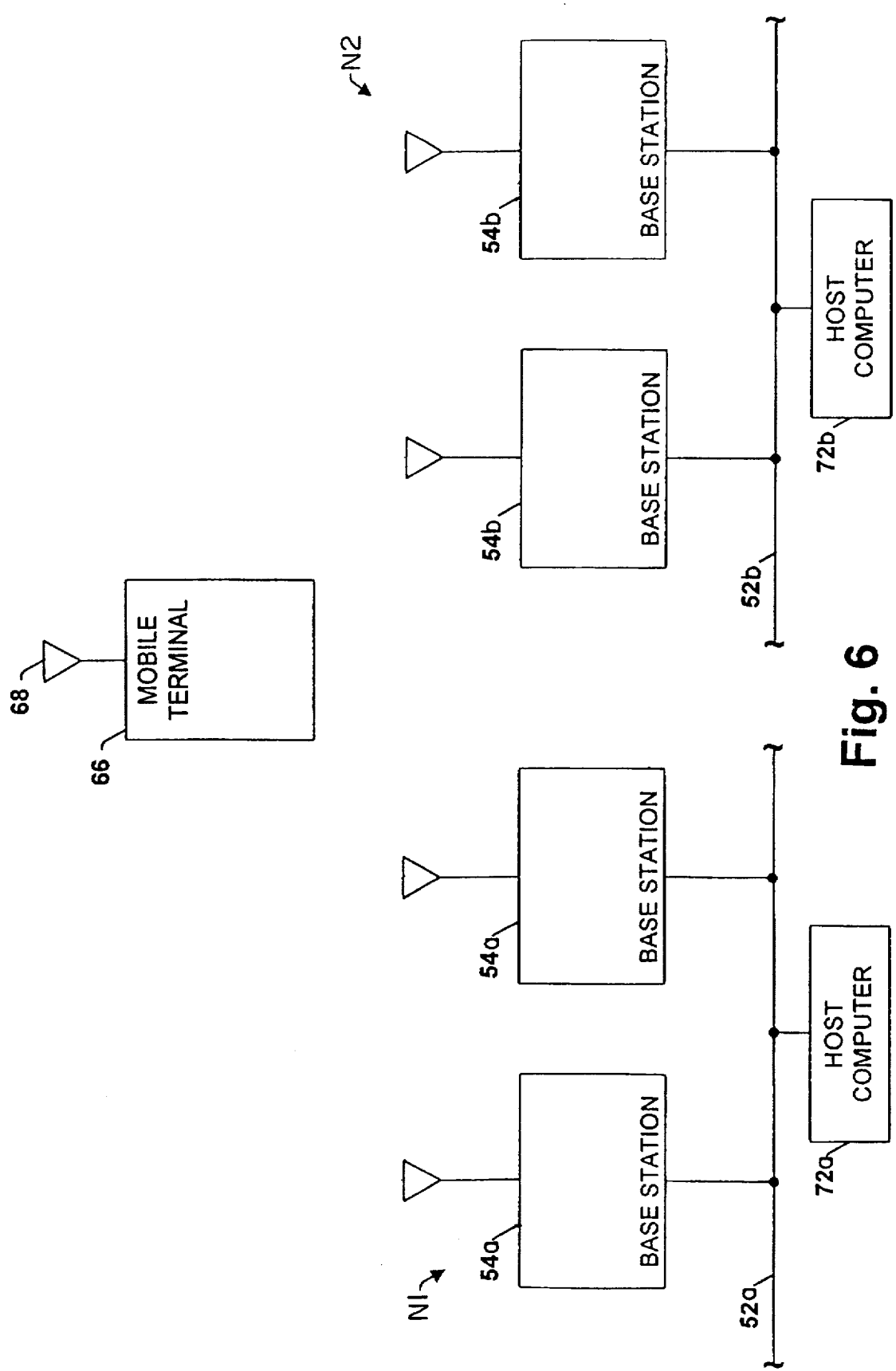
FIG. 6 is a block diagram of a cellular communication system in accordance with another embodiment of the present invention.

Referring briefly to FIG. 6, a cellular communication system is shown in accordance with another embodiment of the invention. The system includes a first communications network N1 including a first network backbone 52a, a first host computer 72a coupled to the first backbone, and at least one first base station 54a coupled to the first system backbone 52a and communicating with the first host computer 72a. Each of the first base stations 54a has a base station transceiver (not shown) for transmitting and receiving wireless communications. The system further includes a second communications network N2 including a second network backbone 52b, a second host computer 72b coupled to the second backbone 52b, and at least one second base station 54b coupled to the second system backbone 52b and communicating with the second host computer 72b. Each of the second base stations 54b has a base station transceiver (not shown) for transmitting and receiving wireless communications.

In addition, the system includes at least one mobile device 66. Each mobile device 66 includes an antenna, and a plurality of radios within a portable housing (not shown) each operatively connected to the antenna 68 for transmitting and receiving signals using the antenna 68. A first radio included in the plurality of radios communicates with at least one of the first base stations 54a coupled to said first system backbone 52a, and a second radio included in the plurality of radios communicates with at least one of the second base stations 54b coupled to said second system backbone 52b.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A mobile device, comprising:
   an antenna;
   a plurality of radios each operatively connected to the antenna for transmitting and receiving signals using the antenna; and
   a portable housing in which the plurality of radios are located,
   wherein the antenna is circularly polarized.

2. The mobile device of claim 1, wherein the plurality of radios operate in different respective frequency bands.

3. A mobile device, comprising:
   an antenna;
   a plurality of radios each operatively connected to the antenna for transmitting and receiving signals using the antenna; and
   a portable housing in which the plurality of radios are located,
   wherein the antenna is omnidirectional.

4. A mobile device, comprising:
   an antenna;
   a plurality of radios each operatively connected to the antenna for transmitting and receiving signals using the antenna; and
   a portable housing in which the plurality of radios are located,
   wherein the plurality of radios operate using the antenna substantially simultaneously.

5. A mobile device, comprising:
   an antenna;
   a plurality of radios each operatively connected to the antenna for transmitting and receiving signals using the antenna;
   a portable housing in which the plurality of radios are located; and
   further comprising a processor for processing data received or transmitted by any of the plurality of radios.

6. A mobile device, comprising:
   an antenna;
   a plurality of radios each operatively connected to the antenna for transmitting and receiving signals using the antenna;
   a portable housing in which the plurality of radios are located; and
   further comprising a bar code reader for inputting information to the mobile device.

7. A method of operating a mobile device including a plurality of radios, the method including the steps of:
   using a first radio selected from the plurality of radios and operatively coupled to an antenna to transmit and receive radio signals by way of the antenna; and
   using a second radio selected from the plurality of radios and operatively coupled to the antenna to transmit and receive radio signals by way of the antenna,
   wherein the antenna is circularly polarized.

8. The method of claim 7, wherein the plurality of radios operate in different respective frequency bands.

9. A method of operating a mobile device including a plurality of radios, the method including the steps of:
   using a first radio selected from the plurality of radios and operatively coupled to an antenna to transmit and receive radio signals by way of the antenna; and
   using a second radio selected from the plurality of radios and operatively coupled to the antenna to transmit and receive radio signals by way of the antenna,
   wherein the antenna is omnidirectional.

10. A method of operating a mobile device including a plurality of radios, the method including the steps of:
    using a first radio selected from the plurality of radios and operatively coupled to an antenna to transmit and receive radio signals by way of the antenna; and
    using a second radio selected from the plurality of radios and operatively coupled to the antenna to transmit and receive radio signals by way of the antenna,
    wherein the plurality of radios operate using the antenna substantially simultaneously.

11. A method of operating a mobile device including a plurality of radios, the method including the steps of:
    using a first radio selected from the plurality of radios and operatively coupled to an antenna to transmit and receive radio signals by way of the antenna;
    using a second radio selected from the plurality of radios and operatively coupled to the antenna to transmit and receive radio signals by way of the antenna; and
    further comprising the step of using a processor for processing data received or transmitted by any of the plurality of radios.

12. A method of operating a mobile device including a plurality of radios, the method including the steps of:
    using a first radio selected from the plurality of radios and operatively coupled to an antenna to transmit and receive radio signals by way of the antenna;
    using a second radio selected from the plurality of radios and operatively coupled to the antenna to transmit and receive radio signals by way of the antenna; and
    further comprising the step of using a bar code reader for inputting information to the mobile device.

13. A cellular communication system, comprising:
    a system backbone;
    a host computer coupled to the system backbone;
    a plurality of base stations coupled to the system backbone and communicating with the host computer, each of the base stations comprising a base station transceiver for transmitting and receiving wireless communications;
    a local computer including a local computer transceiver for transmitting and receiving wireless communications; and
    at least one mobile device, each of the at least one mobile device including:
      an antenna; and
      a plurality of radios within a portable housing each operatively connected to the antenna for transmitting and receiving signals using the antenna;
      wherein a first radio included in the plurality of radios communicates with at least one of the plurality of base stations, and a second radio included in the plurality of radios communicates with the local computer transceiver.

14. The system of claim 13, wherein the antenna is circularly polarized.

15. The system of claim 13, wherein the plurality of radios operate in different respective frequency bands.

16. The system of claim 13, wherein the antenna is omnidirectional.

17. The system of claim 13, wherein the plurality of radios operate using the antenna substantially simultaneously.

18. The system of claim 13, further comprising a processor for processing data received or transmitted by any of the plurality of radios.

19. The system of claim 13, further comprising a bar code reader for inputting information to the mobile device.

20. A mobile device, comprising:
an antenna system;
a radio operatively connected to the antenna system for transmitting and receiving signals using the antenna system; and
a portable housing in which the radio is located,
wherein the antenna system comprises a first antenna which is right hand circularly polarized and a second antenna which is left hand circularly polarized.

21. The mobile device of claim 20, wherein the mobile device comprises a plurality of radios each operatively coupled to the antenna system.

22. A cellular communication system, comprising:
a first communications network including:
a first network backbone;
a first host computer coupled to the first backbone; and
at least one first base station coupled to the first system backbone and communicating with the first host computer, each of the first base stations having a base station transceiver for transmitting and receiving wireless communications;
a second communications network including:
a second network backbone;
a second host computer coupled to the second backbone; and
at least one second base station coupled to the second system backbone and communicating with the second host computer, each of the second base stations having a base station transceiver for transmitting and receiving wireless communications; and
at least one mobile device, each of the at least one mobile device including:
an antenna; and
a plurality of radios within a portable housing each operatively connected to the antenna for transmitting and receiving signals using the antenna;
wherein a first radio included in the plurality of radios communicates with at least one of the at least one first base stations coupled to said first system backbone, and a second radio included in the plurality of radios communicates with at least one of the at least one second base stations coupled to said second system backbone.

23. The system of claim 22, wherein the antenna is circularly polarized.

24. The system of claim 23, wherein the antenna is omindirectional.

25. The system of claim 22, wherein the plurality of radios operate using the antenna substantially simultaneously.

* * * * *